United States Patent
Vitt et al.

(10) Patent No.: US 12,497,917 B2
(45) Date of Patent: Dec. 16, 2025

(54) COUNTER-ROTATING TURBINE

(71) Applicants: General Electric Company, Schenectady, NY (US); GE Avio S.r.l., Rivalta di Torino (IT); General Electric Deutschland Holding GmbH, Frankfurt (DE)

(72) Inventors: Paul Hadley Vitt, Liberty Township, OH (US); Lyle Douglas Dailey, Cincinnati, OH (US); Matteo Renato Usseglio, Turin (IT); Andreas Peters, Munich (DE)

(73) Assignees: General Electric Company, Evendale, OH (US); GE Avio S.r.l., Rivalta di Torino (IT); General Electric Deutschland Holding GmbH, Frankfurt (DE)

( * ) Notice: Subject to any disclaimer, the term of this patent is extended or adjusted under 35 U.S.C. 154(b) by 0 days.

(21) Appl. No.: 17/747,497

(22) Filed: May 18, 2022

(65) Prior Publication Data
US 2023/0374935 A1    Nov. 23, 2023

(51) Int. Cl.
*F02C 3/067* (2006.01)
*F02C 6/00* (2006.01)
*F02C 7/36* (2006.01)

(52) U.S. Cl.
CPC ............ *F02C 3/067* (2013.01); *F02C 6/00* (2013.01); *F02C 7/36* (2013.01); *F05D 2220/76* (2013.01)

(58) Field of Classification Search
CPC ............ F02C 3/067; F02C 6/00; F02C 7/36
See application file for complete search history.

(56) References Cited

U.S. PATENT DOCUMENTS

| | | |
|---|---|---|
| 3,135,496 A | 6/1964 | Scheper, Jr. |
| 4,502,837 A | 3/1985 | Blair et al. |
| 4,981,414 A | 1/1991 | Sheets |
| 5,152,661 A | 10/1992 | Sheets |
| 5,209,644 A | 5/1993 | Dorman |
| 5,352,092 A | 10/1994 | Ferleger et al. |
| 5,616,004 A | 4/1997 | Alizadeh |
| 5,779,443 A | 7/1998 | Haller et al. |
| 6,375,419 B1 | 4/2002 | LeJambre et al. |

(Continued)

FOREIGN PATENT DOCUMENTS

| | | | |
|---|---|---|---|
| EP | 3124794 A1 | 2/2017 | |
| EP | 3460182 A1 * | 3/2019 | ............ F01D 1/26 |

*Primary Examiner* — Lindsay M Low
*Assistant Examiner* — Sean V Meiller
(74) *Attorney, Agent, or Firm* — Dority & Manning, P.A.

(57) ABSTRACT

A turbine section for a gas turbine engine defines a radial direction and includes a low-pressure (LP) turbine that includes a first plurality of LP turbine blades that includes a first stage having first stage LP turbine blades that rotate in a first direction at a first speed, a second plurality of LP turbine blades that includes a plurality of stages of LP turbine blades disposed downstream of the first stage LP turbine blades that rotate in a second direction opposite the first direction at a second speed, a first LP turbine spool connected to the first plurality of LP turbine blades on an inner side of the first plurality of LP turbine blades in the radial direction, and a second LP turbine spool connected to the second plurality of LP turbine blades on an inner side of the second plurality of LP turbine blades in the radial direction.

16 Claims, 7 Drawing Sheets

(56) References Cited

U.S. PATENT DOCUMENTS

| | | |
|---|---|---|
| 6,709,239 B2 | 3/2004 | Chandraker |
| 6,711,887 B2 | 3/2004 | Orlando et al. |
| 6,799,948 B2 | 10/2004 | Ito et al. |
| 6,802,474 B2 | 10/2004 | Sonoda et al. |
| 7,175,393 B2 | 2/2007 | Chandraker |
| 7,179,058 B2 | 2/2007 | Chandraker |
| 7,204,676 B2 | 4/2007 | Dutton et al. |
| 7,374,403 B2 | 5/2008 | Decker et al. |
| 7,416,382 B2 | 8/2008 | Guemmer |
| 7,419,353 B2 | 9/2008 | Guemmer |
| 7,451,592 B2 * | 11/2008 | Taylor ............... F02C 3/067 60/268 |
| 7,967,571 B2 | 6/2011 | Wood et al. |
| 8,157,518 B2 | 4/2012 | Decker et al. |
| 8,292,570 B2 | 10/2012 | Suciu et al. |
| 8,292,574 B2 | 10/2012 | Wood et al. |
| 8,337,154 B2 | 12/2012 | Decker et al. |
| 8,439,646 B2 | 5/2013 | Guemmer |
| 8,468,826 B2 | 6/2013 | Kares et al. |
| 8,517,677 B2 | 8/2013 | Wood et al. |
| 8,573,946 B2 | 11/2013 | Power et al. |
| 8,678,757 B2 | 3/2014 | Li |
| 8,864,457 B2 | 10/2014 | Malandra et al. |
| 9,046,111 B2 | 6/2015 | Harvey et al. |
| 9,080,512 B2 | 7/2015 | Suciu et al. |
| 9,200,518 B2 | 12/2015 | Kares |
| 9,777,578 B2 | 10/2017 | Yokoyama et al. |
| 9,790,796 B2 | 10/2017 | Stampfli et al. |
| 9,797,267 B2 | 10/2017 | Lohaus et al. |
| 9,945,266 B2 | 4/2018 | Ekanayake et al. |
| 10,233,761 B2 | 3/2019 | Snider et al. |
| 10,577,956 B2 | 3/2020 | Northall et al. |
| 10,697,471 B2 | 6/2020 | Northall et al. |
| 10,830,130 B2 * | 11/2020 | Suciu ............... F02C 3/107 |
| 11,015,449 B2 | 5/2021 | Koda et al. |
| 11,149,549 B2 | 10/2021 | Koda |
| 2007/0053779 A1 | 3/2007 | Guemmer |
| 2008/0131272 A1 | 6/2008 | Wood et al. |
| 2008/0141650 A1 * | 6/2008 | Johnson ............... F02K 3/06 29/888.025 |
| 2008/0149205 A1 | 6/2008 | Gupta et al. |
| 2009/0123276 A1 | 5/2009 | Greim et al. |
| 2010/0133832 A1 * | 6/2010 | Butt ............... F02K 3/025 290/46 |
| 2010/0154383 A1 * | 6/2010 | Ress, Jr. ............... F02C 7/36 60/226.3 |
| 2011/0129346 A1 | 6/2011 | Jarrah et al. |
| 2012/0237344 A1 | 9/2012 | Wood et al. |
| 2013/0089415 A1 | 4/2013 | Brown et al. |
| 2014/0133982 A1 | 5/2014 | Dejeu et al. |
| 2014/0234095 A1 | 8/2014 | Auchoybur |
| 2015/0284070 A1 | 10/2015 | Breeze-Stringfellow et al. |
| 2016/0052621 A1 | 2/2016 | Ireland et al. |
| 2016/0177723 A1 | 6/2016 | Lohaus et al. |
| 2016/0195010 A1 | 7/2016 | Roberge |
| 2018/0112547 A1 | 4/2018 | Snider et al. |
| 2018/0363554 A1 | 12/2018 | Kroger et al. |
| 2019/0048724 A1 | 2/2019 | Tweedt |
| 2019/0063313 A1 | 2/2019 | Rez et al. |
| 2019/0085715 A1 * | 3/2019 | van der Merwe ... H02K 7/1823 |
| 2019/0301286 A1 | 10/2019 | Spangler et al. |
| 2019/0309681 A1 * | 10/2019 | Townes ............... F02C 3/13 |
| 2021/0087940 A1 | 3/2021 | Clark et al. |
| 2021/0108597 A1 | 4/2021 | Ostdiek et al. |
| 2021/0189883 A1 | 6/2021 | Koda |
| 2021/0270137 A1 | 9/2021 | Sozio et al. |
| 2021/0310417 A1 | 10/2021 | Hrubec et al. |

* cited by examiner

COUNTER-ROTATING TURBINE

FIELD

The present subject matter relates generally to a counter-rotating turbine of a gas turbine engine. More specifically, the subject matter relates to a counter-rotating low-pressure turbine of a gas turbine engine.

BACKGROUND

A gas turbine engine typically includes a fan and a turbomachine. The turbomachine generally includes an inlet, one or more compressors, a combustor, and one or more turbines. The compressors compress air channeled to the combustor where the compressed air is mixed with fuel. The mixture is then ignited for generating hot combustion gases. The combustion gases are channeled to the one or more turbines which extract energy from the combustion gases for powering the compressors, and for producing useful work to propel an aircraft in flight, to power a load such as an electric generator, or a combination thereof.

The one or more turbines may include a low-pressure turbine. When the low-pressure turbine is directly connected to a fan shaft to drive the fan, they are generally rotated at lower speeds as they are rotated at the same speed as the fan.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Reference will now be made in detail to embodiments of the disclosure, one or more examples of which are illustrated in the accompanying drawings. Each example is provided by way of explanation of the disclosure and is not intended to be limiting in any way. In fact, it will be apparent to those skilled in the art that various modifications and variations may be made in the present disclosure without departing from the scope or spirit of the disclosure. For instance, features illustrated or described as part of one embodiment may be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low-speed turbine" defines a component configured to operate at a rotational speed, such as a maximum allowable rotational speed, lower than a "high turbine" or "high-speed turbine" of the engine.

As used herein, ceramic-matrix-composite or "CMC" refers to a class of materials that include a reinforcing material (e.g., reinforcing fibers) surrounded by a ceramic matrix phase. Generally, the reinforcing fibers provide structural integrity to the ceramic matrix. Some examples of matrix materials of CMCs can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) may also be included within the CMC matrix.

Some examples of reinforcing fibers of CMCs can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Generally, particular CMCs may be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs may be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain embodiments, the reinforcing fibers may be bundled, coated, or a combination thereof, prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

While conventional gas turbine engines have low-pressure turbines that operate at comparatively low-speeds to drive the low-speed compressor, the fan, or a combination thereof, gas turbine engines may instead employ high-speed low-pressure turbines which rotate at a higher speed than the conventional low-pressure turbines. A high-speed low-pressure turbine may provide more efficiency than a low-speed low-pressure turbine. Thus, a high-speed low-pressure turbine may be coupled to the fan shaft via a reducing gearbox in the fan module that reduces the speed from the high-speed low-pressure turbine to the fan shaft. Thus, reducing gearbox may reduce the rotation speed of the fan from the high rotation speed of the high-speed low-pressure turbines. However, the inventors of the present disclosure have found that due to higher stresses caused by the higher speeds, there are material and capability restrictions for blades for the high-speed low-pressure turbine.

However, due to the increased rotation speeds, the blades of the high-speed low-pressure turbines may experience increased stresses compared to conventional low-pressure turbines. Because an increase in size of the blades also increases an amount of stress experienced thereby, a material capability of the blades may require a size of the blades to be reduced to compensate for the increased stresses caused by the higher rotation speeds. Therefore, high-speed low-pressure turbines may have a limited annulus area due to blade material capability. Additionally, the blade material may be limited by the stresses Additionally, the temperature of combustion gases flowing through the low-pressure turbine may limit the material and size of the blades. Out of all of the stages of the low-pressure turbine, the first stage low-pressure turbine blades experience the highest temperatures. Thus, when the low-pressure turbine is a high-speed low-pressure turbine, the first stage low-pressure turbine blades may limit the radial size of the low-pressure turbine.

A counter-rotating low-pressure turbine according to one or more embodiments allows for larger turbine blades within high-speed low-pressure turbines and a more axially compact package. According to one or more embodiments, by allowing for lower speed first stage low-pressure turbine blades, the first stage low-pressure turbine blades may be formed to have larger radial dimensions, which in turn may allow for larger radial dimensions for the downstream high-speed low-pressure turbine blades that do not experience the higher temperatures of the first stage low-pressure turbines, resulting in larger annulus flow areas. Furthermore, the lower speed of the first stage low-pressure turbine blades may allow for material flexibility.

Certain vaneless counter-rotating turbines require an outer drum to retain the low-speed blades, which could add mechanical design challenges and engine system complexity.

One or more embodiments includes drumless vaneless counter-rotating turbines. Recognizing that higher exhaust gas temperature of the exhaust gas exiting the high pressure turbine and entering the low pressure turbine generally results in higher performance, and first low-pressure turbine rotor blade material capability limits the engine exhaust gas temperature, first stage low-pressure turbine blades are counter-rotated at a lower speed than the high-speed low-pressure turbine rotor blades. Blade stresses are reduced by the lower speed, allowing higher exhaust gas temperature without or with less cooling, a more optimized low-pressure turbine flowpath, or a combination thereof.

Replacing the first stage of a single rotation high-speed low-pressure turbine with a vaneless counter-rotating turbine blade allows the rotational speed for the first stage to be reduced, increasing exhaust gas temperature capability. Additionally, the lower speed of the first stage may enable a material with higher temperature capabilities but lower strength capabilities such as CMC. Additionally, such a structure may increase the low-pressure turbine efficiency by improving the first stage throughflow and retaining the high-speed low-pressure turbine benefits of the aft stages.

Additionally, the lower speed of the first stage low-pressure turbine rotor blades enables a smaller first stage low-pressure turbine rotor disk, which may improve packaging with the high-pressure turbine aft bearing and reduce low-pressure turbine length. Furthermore, the low-pressure turbine length may also be reduced by removal of a vane between the first stage low-pressure turbine rotor blades and the second stage low-pressure turbine rotor blades. Furthermore, efficiency of the second stage low-pressure turbine rotor blades may improve due to counter-rotating aerodynamic effects the first stage low-pressure turbine rotor blades, and removal of the losses at the vane therebetween.

Figure 1:
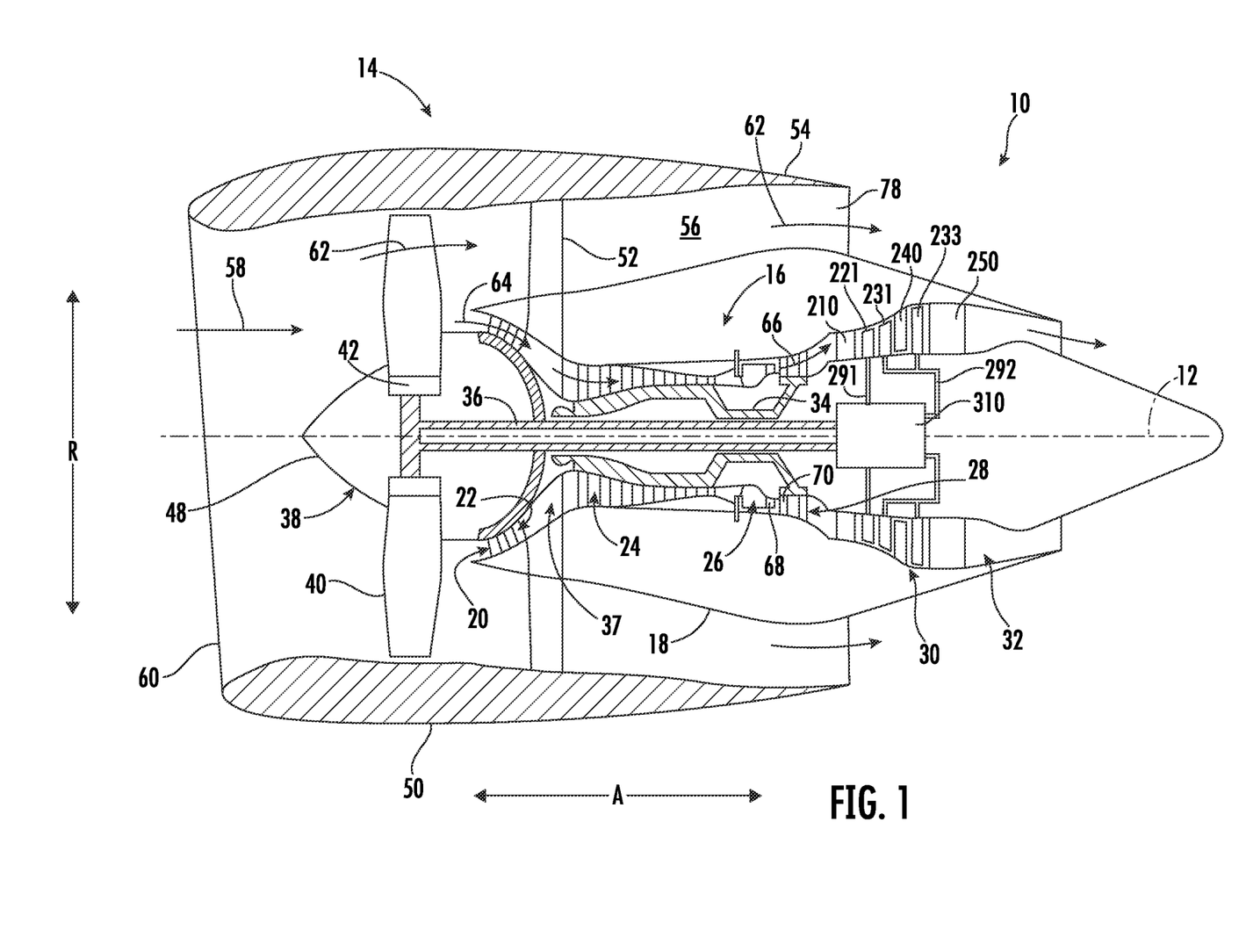
FIG. 1 is a schematic cross-sectional view of a gas turbine engine according to one or more embodiments.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine, referred to herein as "gas turbine engine 10." As shown in FIG. 1, the gas turbine engine 10 defines an axial direction A (extending parallel to a longitudinal centerline 12 provided for reference), a radial direction R, and a circumferential direction (i.e., a direction extending about the axial direction A; not depicted). In general, the gas turbine engine 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low-pressure (LP) compressor 22 and a high-pressure (HP) compressor 24; a combustion section 26; a turbine section including a high-pressure (HP) turbine 28 and a low-pressure (LP) turbine 30; and an exhaust section 32. The compressor section, combustion section 26, and turbine section together define a core air flowpath 37 extending from the annular inlet 20 through the LP compressor 22, HP compressor 24, combustion section 26, HP turbine 28, LP turbine 30 and exhaust section 32. A high-pressure (HP) shaft or spool 34 drivingly connects the HP turbine 28 to the HP compressor 24. A low-pressure (LP) shaft or spool 36 drivingly connects the LP turbine 30 to the LP compressor 22.

For the embodiment depicted, the fan section 14 includes a fan 38 having a plurality of fan blades 40 coupled to a disk 42 in a spaced apart manner. As depicted, the fan blades 40 extend outwardly from disk 42 generally along the radial direction R. The fan blades 40 and disk 42 are together rotatable about the longitudinal centerline 12 by LP shaft or spool 36. According to one or more embodiments, the LP shaft or spool 36 may also be a fan shaft coupled to the disk 42 to drive the fan blades 40.

Referring still to the exemplary embodiment of FIG. 1, the disk 42 is covered by a rotatable spinner cone 48 aerodynamically contoured to promote an airflow through the plurality of fan blades 40. Additionally, the exemplary fan section 14 includes an annular fan casing or outer nacelle 50 that circumferentially surrounds the fan 38, at least a portion of the turbomachine 16, or a combination thereof. It should be appreciated that for the embodiment depicted, the outer nacelle 50 is supported relative to the turbomachine 16 by a plurality of circumferentially spaced outlet guide vanes 52. Moreover, a downstream section 54 of the outer nacelle 50 extends over an outer portion of turbomachine 16 so as to define a bypass airflow passage 56 therebetween.

During operation of the gas turbine engine 10, a volume of air 58 enters the gas turbine engine 10 through an associated inlet 60 of the outer nacelle 50, fan section 14, or a combination thereof. As the volume of air 58 passes across the fan blades 40, a first portion of air 62 from the volume of air 58 is directed or routed into the bypass airflow passage 56 and a second portion of air 64 from the volume of air 58 is directed or routed into the LP compressor 22. The ratio between the first portion of air 62 and the second portion of air 64 is commonly known as a bypass ratio. The pressure of the second portion of air 64 is then increased as it is routed through the HP compressor 24 and into the combustion section 26, where it is mixed with fuel and burned to provide combustion gases 66.

The combustion gases 66 are routed through the HP turbine 28 where a portion of thermal energy, kinetic energy, or a combination thereof from the combustion gases 66 is extracted via sequential stages of HP turbine stator vanes 68 that are coupled to an inner casing (not shown) and HP turbine rotor blades 70 that are coupled to the HP shaft or spool 34, thus causing the HP shaft or spool 34 to rotate, thereby supporting operation of the HP compressor 24.

The combustion gases 66 are then routed through the LP turbine 30 where a second portion of thermal and kinetic energy is extracted from the combustion gases 66 via a first plurality of LP turbine blades and a second plurality of LP turbine blades. The first plurality of LP turbine blades includes a stage of LP turbine blades labeled in FIG. 1 and described herein as a first stage having first stage LP turbine rotor blades 221 that rotate in a first direction C1 around the longitudinal centerline 12. The second plurality of LP turbine blades includes a plurality of stages of LP turbine blades disposed downstream of the first plurality of LP turbine blades, labeled in FIG. 1 and described herein as including at least a second stage having second stage LP turbine rotor blades 231 and a third stage having third stage LP turbine rotor blades 233 (and in certain embodiments a fourth stage; see, e.g., FIG. 3). The second plurality of LP turbine rotor blades, including the second stage LP turbine rotor blades 231 and the third stage LP turbine rotor blades 233, rotate together in a second direction C2 around the longitudinal centerline 12 opposite the first direction C1. While FIGS. 2-7 show specific directions for the first direction C1 and the second direction C2, the directions shown are merely exemplary, and may be flipped, as long as the first direction C1 and second direction C2 are opposite directions.

Moreover, in the embodiment depicted the gas turbine engine 10 further includes first LP turbine guide vanes 210 disposed upstream of the first stage LP turbine rotor blades 221, and second LP turbine guide vanes 240 disposed between the second stage LP turbine rotor blades 231 and the third stage LP turbine rotor blades 233. An outer radial end of each of the first stage LP turbine rotor blades 221, each of the second stage LP turbine rotor blades 231, and each of the third stage LP turbine rotor blades 233 are isolated, and not connected to an outer drum of the LP turbine 30. In the embodiment depicted in FIG. 1, the first stage LP turbine rotor blades 221 are connected via a first LP turbine spool 291 that rotates in the first direction C1 around the longitudinal centerline 12 and is coupled to a gearbox 310. Alternatively, the first LP turbine spool 291 may instead be directly connected to the LP shaft or spool 36 or coupled to an electric generator. The second stage LP turbine rotor blades 231 and the third stage LP turbine rotor blades 233 are connected to a second LP turbine spool 292 that rotates in the second direction C2 and is also coupled to the gearbox 310. Alternatively, the second LP turbine spool 292 may be coupled to an electric generator (not shown). The gearbox 310 is further coupled to the LP shaft or spool 36, such that the first stage LP turbine rotor blades 221, the second stage LP turbine rotor blades 231, and the third stage LP turbine rotor blades 233 drive the LP shaft or spool 36 to rotate through the gearbox 310. Thus, the LP turbine 30 supports operation of the LP compressor 22, the rotation of the fan 38, or a combination thereof.

Subsequent to passing through the LP turbine 30, the combustion gases 66 are routed through the exhaust section 32 of the turbomachine 16 to provide propulsive thrust. According to one or more embodiments, the exhaust section 32 includes a heat exchanger 250 disposed immediately downstream of the third stage LP turbine rotor blades 233. According to one or more embodiments, there are additional stage(s) of LP turbine rotor blades downstream of the third stage LP turbine rotor blades 233 in which case, according to one or more embodiments, the heat exchanger 250 is disposed directly downstream of final stage LP turbine rotor blades.

Simultaneously, the pressure of the first portion of air 62 is substantially increased as the first portion of air 62 is routed through the bypass airflow passage 56 before it is exhausted from a fan nozzle exhaust section 78 of the gas turbine engine 10, also providing propulsive thrust. The HP turbine 28, the LP turbine 30, and the exhaust section 32 at least partially define a hot gas path for routing the combustion gases 66 through the turbomachine 16.

It should be appreciated, however, that the exemplary gas turbine engine 10 depicted in FIG. 1 is by way of example only, and that in other exemplary embodiments, the gas turbine engine 10 may have any other suitable configuration. For example, in other exemplary embodiments, the gas turbine engine 10 may instead be configured as any other suitable turbomachine including, e.g., any other suitable number of shafts or spools, and excluding, e.g., the fan 38 or including, e.g., a gearbox between the fan 38 and the LP shaft or spool 36, a variable pitch fan 38, etc. Accordingly, it will be appreciated that in other exemplary embodiments, the gas turbine engine 10 may instead be configured as, e.g., a turbojet engine, a turboshaft engine, a turboprop engine, etc., and further may be configured as an aeroderivative gas turbine engine or industrial gas turbine engine.

Figure 2:
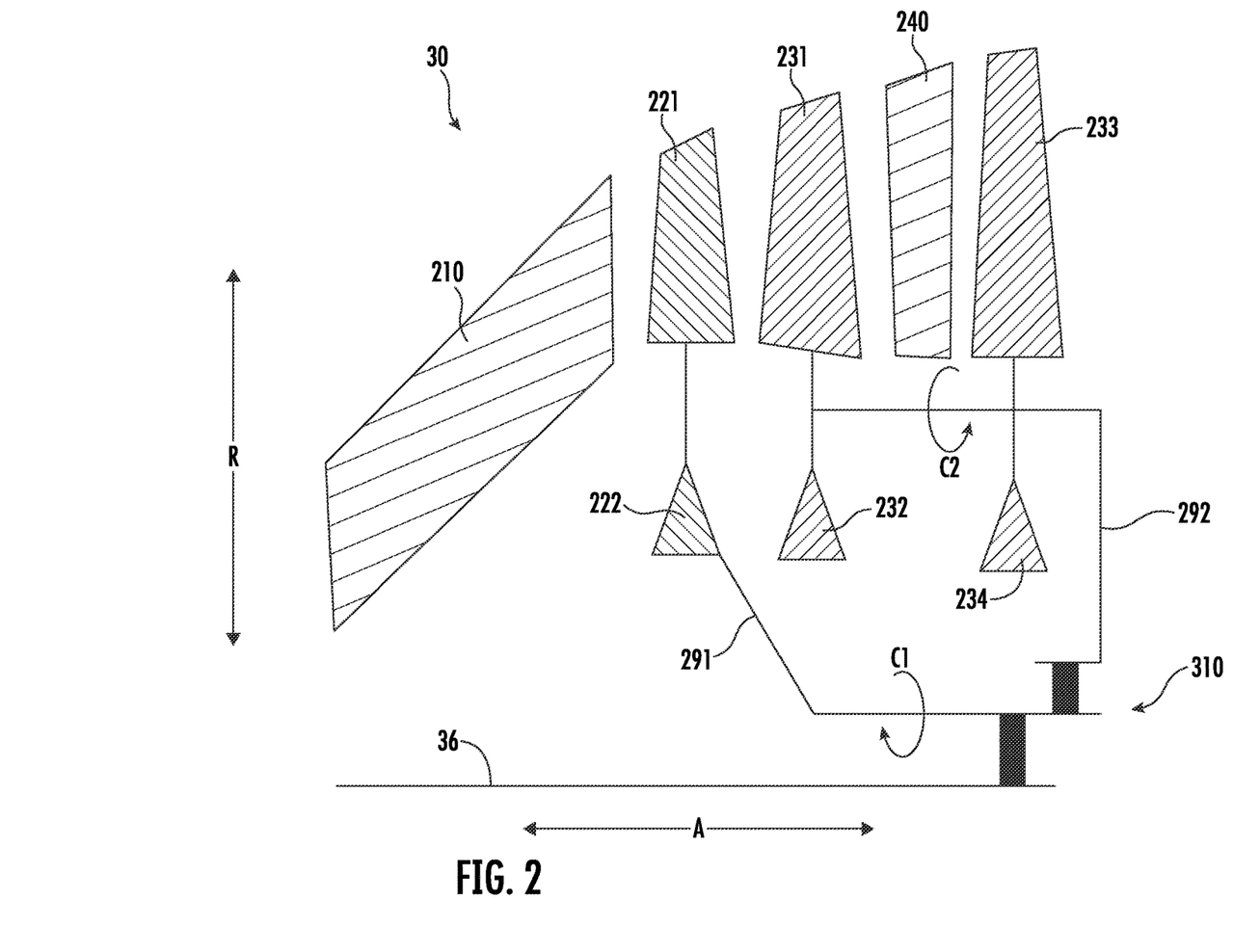
FIG. 2 is a schematic view of a portion of a turbine section of a gas turbine engine according to one or more embodiments.

FIG. 2 is a schematic view of a portion of a turbine section of a gas turbine engine according to one or more embodiments. More specifically, FIG. 2 shows a LP turbine 30 according to one or more embodiments. In certain exemplary embodiments, the turbine section of FIG. 2 may be configured in a similar manner as the exemplary turbine section described above with reference to FIG. 1, and similar reference numbers may be used for similar elements as those in FIG. 1. For example, the turbine section is generally configured as part of a gas turbine engine defining a radial direction R and an axial direction A.

The LP turbine 30 according to one or more embodiments includes a first plurality of LP turbine blades and a second plurality of LP turbine blades. The first plurality of LP turbine blades includes a stage of LP turbine blades described herein as a first stage having first stage LP turbine rotor blades 221 that rotate in a first direction C1 around the longitudinal centerline 12. The second plurality of LP turbine blades includes a plurality of stages of LP turbine blades disposed downstream of the first plurality of LP turbine blades, described herein as including at least a second stage having second stage LP turbine rotor blades 231 and a third stage having third stage LP turbine rotor blades 233. According to one or more embodiments, such as the exemplary embodiment of FIG. 2, the third stage LP turbine rotor blades 233 are final stage LP turbine rotor blades (i.e., the downstream most rotor blades of the LP turbine 30). The second plurality of LP turbine rotor blades, including the second stage LP turbine rotor blades 231 and the third stage LP turbine rotor blades 233, rotate together in a second direction C2 around the longitudinal centerline 12 opposite the first direction C1.

According to one or more embodiments, the first LP turbine guide vanes 210 are high radius-ratio vanes, which is made possible due to the first stage LP turbine rotor blades 221 rotating at a lower speed than the second stage LP turbine rotor blades 231 and the third stage LP turbine rotor blades 233.

According to one or more embodiments, the first LP turbine guide vanes 210 are directly upstream of the first stage LP turbine rotor blades 221, the first stage LP turbine rotor blades 221 are directly upstream of the second stage LP turbine rotor blades 231, the second stage LP turbine rotor blades 231 are directly upstream of the second LP turbine guide vanes 240, and the second LP turbine guide vanes 240 are directly upstream of the third stage LP turbine rotor blades 233. According to one or more embodiments, the first LP turbine guide vanes 210 and the second LP turbine guide vanes 240 are stationary.

The first stage LP turbine rotor blades 221 rotate at a first speed in a first direction C1 around the longitudinal centerline 12. The first stage LP turbine rotor blades 221 are connected to a first LP turbine spool 291 that is driven by the first stage LP turbine rotor blades 221 to rotate in the first direction C1 around the longitudinal centerline 12. According to one or more embodiments, the first LP turbine spool 291 is coupled to a gearbox 310.

The second stage LP turbine rotor blades 231 and the third stage LP turbine rotor blades 233 rotate at a second speed in a second direction C2 around the longitudinal centerline 12, opposite the first direction C1. The second stage LP turbine rotor blades 231 and the third stage LP turbine rotor blades 233 are connected to each other via a second LP turbine spool 292 that is driven by the second stage LP turbine rotor blades 231 and the third stage LP turbine rotor blades 233 to rotate in the second direction C2. According to one or more embodiments, the second LP turbine spool 292 is coupled to the gearbox 310.

According to one or more embodiments, a first LP turbine rotor disk 222 is disposed on an inner side of the first stage LP turbine rotor blades 221 in the radial direction R, a second LP turbine rotor disk 232 is disposed on an inner side of the second stage LP turbine rotor blades 231 in the radial direction R, and a third LP turbine rotor disk 234 is disposed on an inner side of the third stage LP turbine rotor blades 233 in the radial direction R. According to one or more embodiments, the first LP turbine rotor disk 222 is smaller in the radial direction R than each of the second LP turbine rotor disk 232 and the third LP turbine rotor disk 234, as the lower speed of the first stage LP turbine rotor blades 221 allows for smaller disk. According to one or more embodiments, the first LP turbine rotor disk 222 is coupled to the first LP turbine spool 291 so as to rotate together at the first speed in the first direction C1, and the second LP turbine rotor disk 232 and the third LP turbine rotor disk 234 are coupled to the second LP turbine spool 292 so as to rotate together at the second speed in the second direction C2. According to one or more embodiments, the second LP turbine rotor disk 232 and the third LP turbine rotor disk 234 may be coupled together by a connecting structure which may be, for example, a drum. According to one or more embodiments, the first speed is lower than the second speed.

According to one or more embodiments, the gearbox 310 is coupled to the LP shaft or spool 36, such that the first stage LP turbine rotor blades 221, the second stage LP turbine rotor blades 231, and the third stage LP turbine rotor blades 233 drive the LP shaft or spool 36 through the gearbox 310. Thus, the LP turbine 30 supports operation of the LP compressor 22, the rotation of the fan 38, or a combination thereof (see FIG. 1). According to one or more embodiments, the gearbox 310 is disposed partially or entirely on an inner side of the LP turbine 30 in the radial direction R. According to one or more embodiments, the LP shaft or spool 36 rotates at a speed that is lower than the second speed.

According to one or more embodiments, the gearbox 310 may be structured as a planetary gear system (described presently) in which that the LP shaft or spool 36 is fixed to or connected to a sun gear, the first LP turbine spool 291 is connected to planet gears that are disposed around the sun gear and are meshed with the sun gear, and the second LP turbine spool 292 is fixed to or connected to a ring gear disposed around the planet gears and is meshed with the planet gears. Thus, the first LP turbine spool 291 rotates at the first speed in the first direction C1 around the longitudinal centerline 12 (FIG. 1), and the second LP turbine spool 292 rotates at the second speed in the second direction C2 that is higher than the first LP turbine spool 291.

As shown in FIG. 2, the first LP turbine guide vanes 210 are high radius-ratio vanes, and the first stage LP turbine rotor blades 221 have a significantly larger height in the radial direction R than conventional high-speed first stage LP turbine rotor blades. This larger height is possible due to the reduced speed of the first stage LP turbine rotor blades 221 rotating in the first direction C1 opposite the second direction C2 in which the second stage LP turbine rotor blades 231 rotate, as the reduced speed reduces the stresses experienced by the first stage LP turbine rotor blades 221 compared to the aforementioned first stage LP turbine rotor blades of conventional high-speed low-pressure turbines.

Furthermore, the reduction in stresses experienced by the first stage LP turbine rotor blades 221 may also enable materials that could not withstand the larger stresses experienced by the first stage LP turbine rotor blades of conventional high-speed low-pressure turbines. According to one or more embodiments, the first stage LP turbine rotor blades 221, the second stage LP turbine rotor blades 231, and the third stage LP turbine rotor blades 233 are formed of nickel alloys or are formed of a material that comprises nickel alloys. According to one or more embodiments, the first stage LP turbine rotor blades 221 are formed of a different material from the second stage LP turbine rotor blades 231 and the third stage LP turbine rotor blades 233. According to one or more embodiments, the first stage LP turbine rotor blades 221 are formed of titanium aluminide or a material comprising titanium aluminide. As titanium aluminide is lighter than nickel alloys, forming the first stage LP turbine rotor blades 221 of titanium aluminide instead of nickel alloys, enabled by the lower speed of the first stage LP turbine rotor blades 221, results in significant weight savings which in turn enables a more efficient gas turbine engine 10. Alternatively, the first stage LP turbine rotor blades 221 may be formed of ceramic-matrix-composite materials or may be formed of materials including ceramic-matrix-composite materials.

Additionally, due to lower centrifugal stresses on the first stage LP turbine rotor blades 221 that results from the lower speed of rotation thereof, the radius of the first stage LP turbine rotor blades 221 may be increased.

Figure 3:
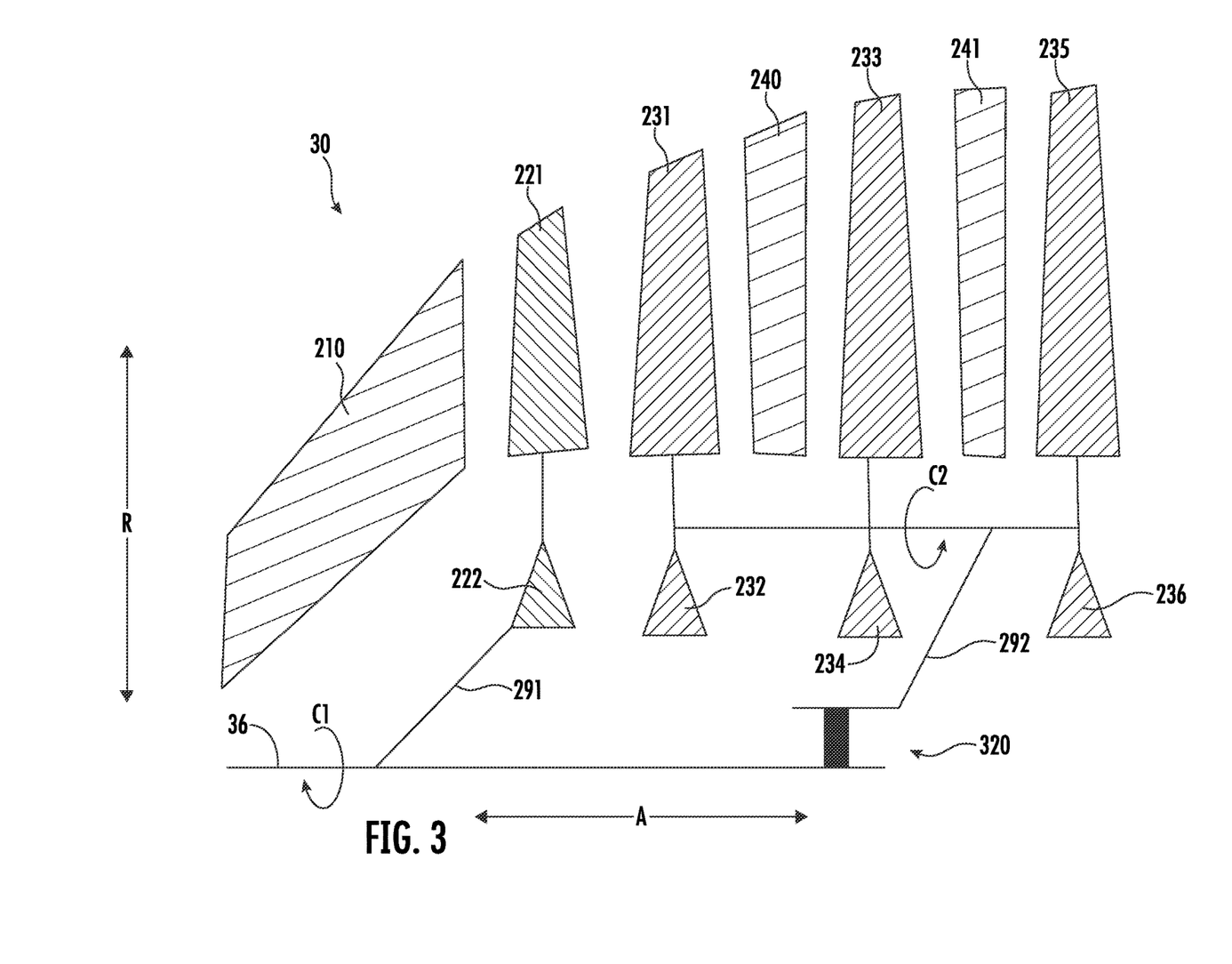
FIG. 3 is a schematic view of a portion of a turbine section of a gas turbine engine according to one or more embodiments.

FIG. 3 is a schematic view of a portion of a turbine section of a gas turbine engine according to one or more embodiments. More specifically, FIG. 3 shows a LP turbine 30 according to one or more embodiments. In certain exemplary embodiments, the turbine section of FIG. 3 may be configured in a similar manner as the exemplary turbine section described above with reference to FIG. 1, and similar reference numbers may be used for similar elements as those in FIG. 1. For example, the turbine section is generally configured as part of a gas turbine engine defining a radial direction R and an axial direction A.

The LP turbine 30 shown in FIG. 3 is similar to that shown in FIG. 2 and, as such, descriptions of the structural elements that are similar thereto are omitted. As shown in FIG. 3, according to one or more embodiments, the LP turbine 30 further includes third LP turbine guide vanes 241 downstream of the third stage LP turbine rotor blades 233, and the second plurality of LP turbine blades further includes a fourth stage having fourth stage LP turbine rotor blades 235 disposed downstream of the third LP turbine guide vanes 241. According to one or more embodiments, the fourth stage LP turbine rotor blades 235 are final stage LP turbine rotor blades.

According to one or more embodiments, the third stage LP turbine rotor blades 233 are directly upstream of the third LP turbine guide vanes 241, and the third LP turbine guide vanes 241 are directly upstream of the fourth stage LP turbine rotor blades 235. According to one or more embodiments, the third LP turbine guide vanes 241 are stationary.

As shown in FIG. 3, according to one or more embodiments, the first LP turbine spool 291 is directly connected to the LP shaft or spool 36 so as to rotate together at a first speed in the first direction C1. According to one or more embodiments, no gears are disposed between the first LP turbine spool 291 and the LP shaft or spool 36. According to one or more embodiments, the fan 38 (FIG. 1) of the gas turbine engine 10 rotates at the first speed. The direct connection between the first LP turbine spool 291 and the LP shaft or spool 36 may improve flight safety, as some power to the fan 38 is retained in case of failure of the gearbox (described presently) or the HP shaft or spool 34.

The second stage LP turbine rotor blades 231, the third stage LP turbine rotor blades 233, and the fourth stage LP turbine rotor blades 235 rotate at a second speed in a second direction C2 around the longitudinal centerline 12, opposite the first direction C1. The second stage LP turbine rotor blades 231, the third stage LP turbine rotor blades 233, and the fourth stage LP turbine rotor blades 235 are connected to each other via the second LP turbine spool 292 that is driven by the second stage LP turbine rotor blades 231, the third stage LP turbine rotor blades 233, and the fourth stage LP turbine rotor blades 235 to rotate in the second direction C2. According to one or more embodiments, the second LP turbine spool 292 is coupled to a gearbox 320 that differs from the gearbox 310 shown in FIG. 2. According to one or more embodiments, the LP shaft or spool 36 is also coupled to the gearbox 320. According to one or more embodiments, the gearbox 320 is a reducing/combining gearbox that reduces the speed from the first speed of the second LP turbine spool 292 to the LP shaft or spool 36.

According to one or more embodiments, a fourth LP turbine rotor disk 236 is disposed on an inner side of the fourth stage LP turbine rotor blades 235 in the radial direction R. According to one or more embodiments, the first LP turbine rotor disk 222 is smaller in the radial direction R than the fourth LP turbine rotor disk 236. According to one or more embodiments, the second LP turbine rotor disk 232, the third LP turbine rotor disk 234, and the fourth LP turbine rotor disk 236 are coupled to the second LP turbine spool 292 so as to rotate together at the second speed in the second direction C2. According to one or more embodiments, the first speed is lower than the second speed. According to one or more embodiments, the second LP turbine spool 292 extends inward in the radial direction R between the third LP turbine rotor disk 234 and the fourth LP turbine rotor disk 236. According to one or more embodiments, the second LP turbine rotor disk 232, the third LP turbine rotor disk 234, and the fourth LP turbine rotor disk 236 may be coupled together by a connecting structure which may be, for example, a drum.

According to one or more embodiments, the gearbox 320 is coupled to the LP shaft or spool 36, such that the second stage LP turbine rotor blades 231, the third stage LP turbine rotor blades 233, and the fourth stage LP turbine rotor blades 235 drive the LP shaft or spool 36 through the gearbox 320, while the first stage LP turbine rotor blades 221 directly drive the LP shaft or spool 36. Thus, the LP turbine 30 supports operation of the LP compressor 22, the rotation of the fan 38, or a combination thereof (see FIG. 1). According to one or more embodiments, the gearbox 320 is disposed partially or entirely on an inner side of the LP turbine 30 in the radial direction R.

According to one or more embodiments, the fourth stage LP turbine rotor blades 235 are formed of nickel alloys or are formed of a material that comprises nickel alloys. According to one or more embodiments, the first stage LP turbine rotor blades 221 are formed of a different material from the fourth stage LP turbine rotor blades 235.

Figure 4A:
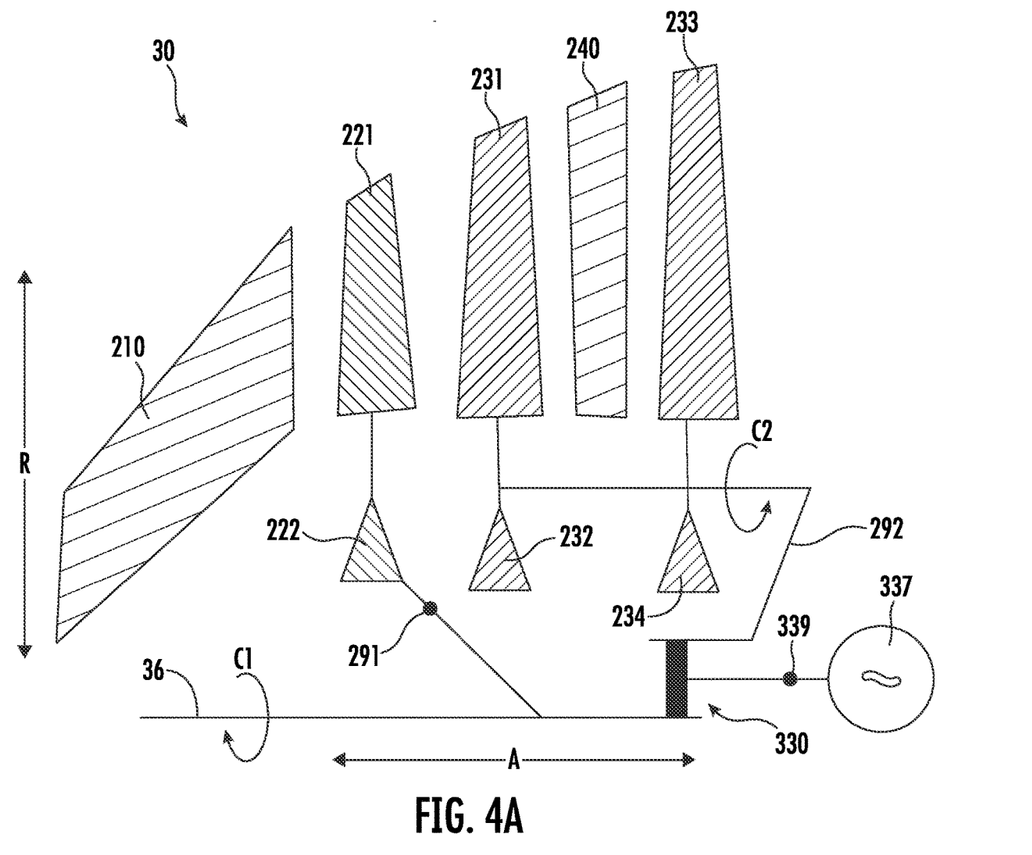
FIG. 4A is a schematic view of a portion of a turbine section of a gas turbine engine according to one or more embodiments.

FIG. 4A is a schematic view of a portion of a turbine section of a gas turbine engine according to one or more embodiments. More specifically, FIG. 4A shows a LP turbine 30 according to one or more embodiments. In certain exemplary embodiments, the turbine section of FIG. 4A may be configured in a similar manner as the exemplary turbine section described above with reference to FIG. 1, and similar reference numbers may be used for similar elements as those in FIG. 1. For example, the turbine section is generally configured as part of a gas turbine engine defining a radial direction R and an axial direction A.

The LP turbine 30 shown in FIG. 4A is similar to that shown in the previous figures and, as such, descriptions of the structural elements that are similar thereto are omitted.

As shown in FIG. 4A, according to one or more embodiments, the first LP turbine spool 291 is directly connected to the LP shaft or spool 36 so as to rotate together at a first speed in the first direction C1. According to one or more embodiments, no gears are disposed between the first LP turbine spool 291 and the LP shaft or spool 36. According to one or more embodiments, the fan 38 (FIG. 1) of the gas turbine engine 10 (FIG. 1) rotates at the first speed. The direct connection between the first LP turbine spool 291 and the LP shaft or spool 36 may improve flight safety, as some power to the fan 38 is retained in case of failure of the gearbox (descried presently) or the HP shaft or spool 34 and may provide some axial load offset.

According to one or more embodiments, the second LP turbine spool 292 and the LP shaft or spool 36 are coupled to a gearbox 330. Additionally, according to one or more embodiments, an electric generator shaft 339 of an electric generator 337 is also coupled to the gearbox 330. According to one or more embodiments, the electric generator 337 may be an electric motor.

Figure 4B:
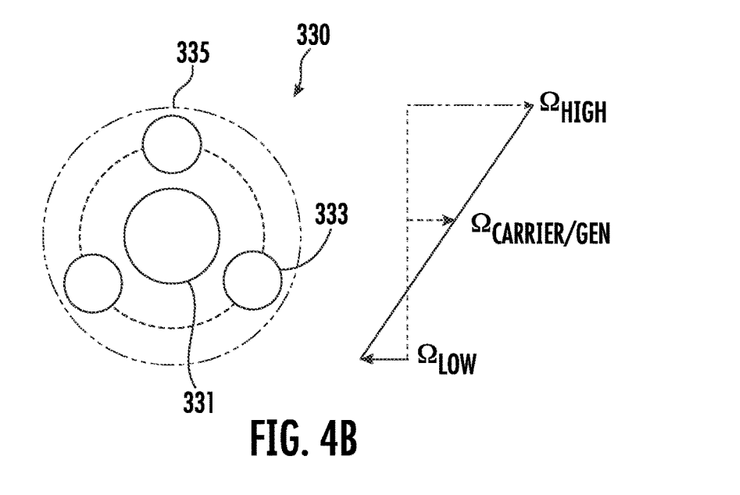
FIG. 4B is a schematic view of a gearbox according to one or more embodiments.

FIG. 4B shows a schematic cross-sectional view of the gearbox 330 according to one or more embodiments. According to one or more embodiments, the gearbox 330 is structured as a planetary gear system in which that the LP shaft or spool 36 is fixed to or connected to a sun gear 331, the electric generator shaft 339 is connected to planet gears 333 that are disposed around the sun gear 331 and are meshed with the sun gear 331, and the second LP turbine spool 292 is fixed to or connected to a ring gear 335 disposed around the planet gears 333 and is meshed with the planet gears 333. Thus, as shown in FIG. 4B, the LP shaft or spool 36 rotates (in a first direction C1 as shown in FIG. 4A) at a low speed $\Omega_{low}$, the second LP turbine spool 292 rotates (in a second direction C2 as shown in FIG. 4A) at a high-speed $\Omega_{high}$, and the electric generator 337 rotates (in the second direction C2 as shown in FIG. 4A) at carrier/generator speed $\Omega_{carrier/gen}$. According to one or more embodiments, as shown in FIG. 4B, the carrier/generator speed $\Omega_{carrier/gen}$ is lower than the high-speed $\Omega_{high}$ of the second LP turbine spool 292.

Referring again to FIG. 4A, according to one or more embodiments, the electric generator 337 generates electricity from the rotation of the electric generator shaft 339. According to one or more embodiments, the electric generator 337 may further include a battery for storing energy. According to one or more embodiments, driving of the electric generator shaft 339 by the LP turbine 30 may charge the battery. According to one or more embodiments, the electric generator 337 may be driven by the battery to rotate the electric generator shaft 339 to thereby drive the LP shaft or spool 36. According to one or more embodiments, the electric generator 337 may provide energy to the core, the aircraft, or a combination thereof.

According to one or more embodiments, the second LP turbine spool 292 and the LP shaft or spool 36 are coupled to the electric generator 337 through the gearbox 330 that is a variable speed gearbox. This may enable the electric generator 337 to control the kinematic relationship between the second LP turbine spool 292 and the LP shaft or spool 36, which could in turn enable optimization across the flight envelope, as well as hybrid electric operation in which power is either extracted to the LP shaft or spool 36 or added to the LP shaft or spool 36 by the electric generator 337.

Figure 5:
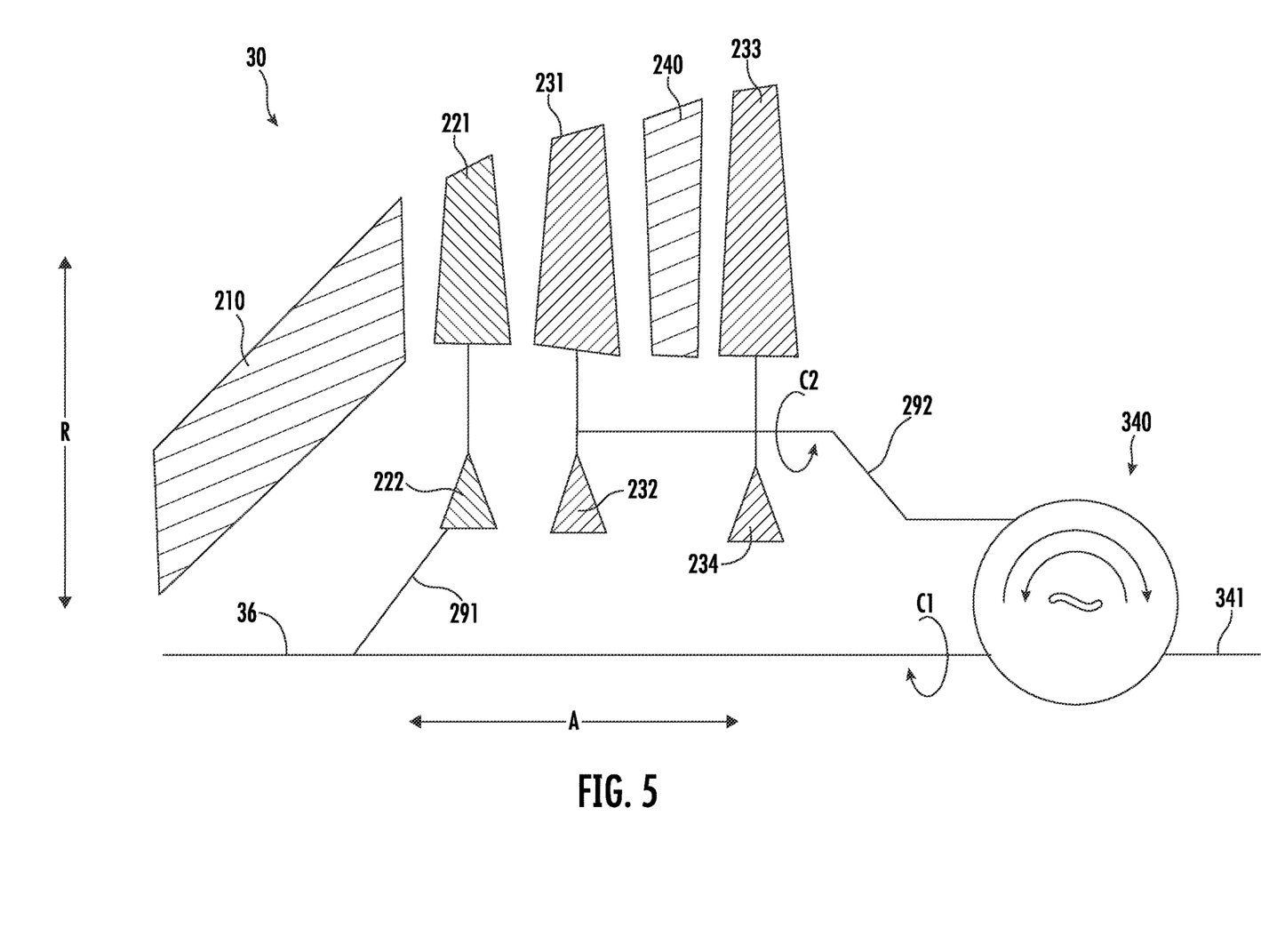
FIG. 5 is a schematic view of a portion of a turbine section of a gas turbine engine according to one or more embodiments.

FIG. 5 is a schematic view of a portion of a turbine section of a gas turbine engine according to one or more embodiments. More specifically, FIG. 5 shows a LP turbine 30 according to one or more embodiments. In certain exemplary embodiments, the turbine section of FIG. 5 may be configured in a similar manner as the exemplary turbine section described above with reference to FIG. 1, and similar reference numbers may be used for similar elements as those in FIG. 1. For example, the turbine section is generally configured as part of a gas turbine engine defining a radial direction R and an axial direction A.

The LP turbine 30 shown in FIG. 5 is similar to that shown in the previous figures and, as such, descriptions of the structural elements that are similar thereto are omitted.

As shown in FIG. 5, according to one or more embodiments, the first LP turbine spool 291 is directly connected to the LP shaft or spool 36 so as to rotate together at a first speed in the first direction C1. According to one or more embodiments, no gears are disposed between the first LP turbine spool 291 and the LP shaft or spool 36. According to one or more embodiments, the fan 38 (FIG. 1) of the gas turbine engine 10 (FIG. 1) rotates at the first speed.

According to one or more embodiments, the second LP turbine spool 292 and the LP shaft or spool 36 are coupled to a contra-rotating electric generator 340. According to one or more embodiments, the contra-rotating electric generator 340 is a multi-axis contra-rotating generator. According to one or more embodiments, the contra-rotating electric generator 340 is a contra-rotating electric motor. According to one or more embodiments, the contra-rotating electric generator 340 provides energy to the core, the aircraft, or a combination thereof an electric power output line 341. According to one or more embodiments, the turbine section does not include a gearbox separately from the contra-rotating electric generator 340. The contra-rotating electric generator 340 receives the input from the first LP turbine spool 291 and outputs power to the LP shaft or spool 36 to drive the fan 38, generate electrical power for the core, generate electrical power for the aircraft, or a combination thereof via the electric power output line 341. According to one or more embodiments, the contra-rotating electric generator 340 may be an axially stacked pancake motor/generator. The contra-rotating electric generator 340 may adaptively tune the speeds of the first LP turbine spool 291 and the second LP turbine spool 292 by controlling resistance to optimize aerodynamic performance across the flight envelope.

Figure 6:
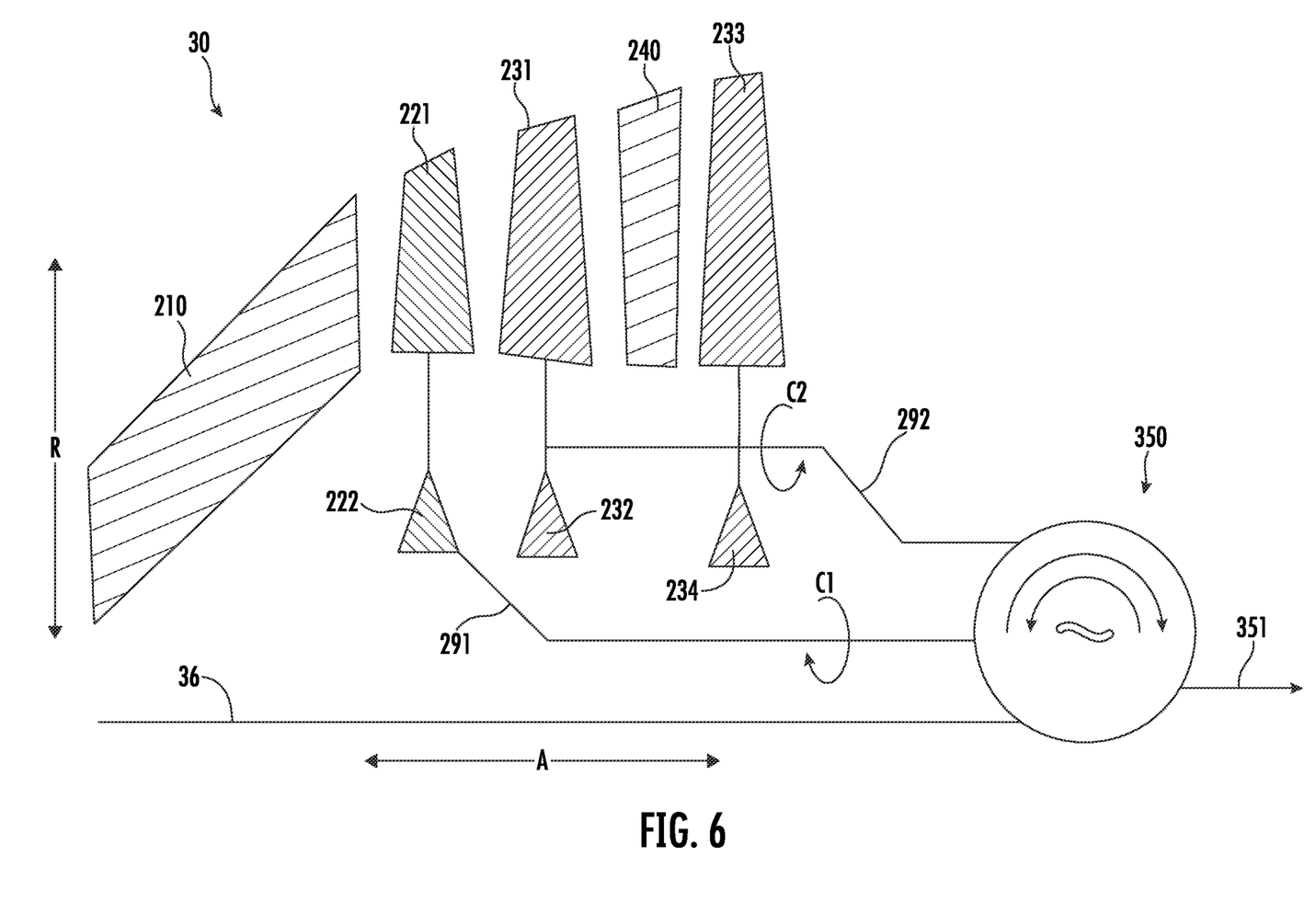
FIG. 6 is a schematic view of a portion of a turbine section of a gas turbine engine according to one or more embodiments.

FIG. 6 is a schematic view of a portion of a turbine section of a gas turbine engine according to one or more embodiments. More specifically, FIG. 6 shows a LP turbine 30 according to one or more embodiments. In certain exemplary embodiments, the turbine section of FIG. 6 may be configured in a similar manner as the exemplary turbine section described above with reference to FIG. 1, and similar reference numbers may be used for similar elements as those in FIG. 1. For example, the turbine section is generally configured as part of a gas turbine engine defining a radial direction R and an axial direction A.

The LP turbine 30 shown in FIG. 6 is similar to that shown in the previous figures and, as such, descriptions of the structural elements that are similar thereto are omitted.

As shown in FIG. 6, according to one or more embodiments, the first LP turbine spool 291, the second LP turbine spool 292, and the LP shaft or spool 36 are coupled to a contra-rotating electric generator 350. According to one or more embodiments, the contra-rotating electric generator 350 may be a contra-rotating electric motor. According to one or more embodiments, the contra-rotating electric generator 350 provides energy to the core, the aircraft, or a combination thereof. According to one or more embodiments, the turbine section does not include a gearbox separately from the contra-rotating electric generator 350. As both the first LP turbine spool 291 and the second LP turbine spool 292 are connected to the contra-rotating electric generator 350, the contra-rotating electric generator 350 may combine power therefrom electrically using a third electric motor to drive the fan shaft. A controller (not shown) may control the contra-rotating electric generator 350 to allow optimization of the operation of the LP turbine 30 across an entire flight envelope. According to one or more embodiments, a majority of power from the contra-rotating electric generator 350 is inputted into the LP shaft or spool 36 to drive the fan 38, while some of the power may be diverted to the core or the aircraft via an electric power output line 351. According to one or more embodiments, all of the power from the contra-rotating electric generator 350 may be inputted into the LP shaft or spool 36 to drive the fan 38.

Figure 7:
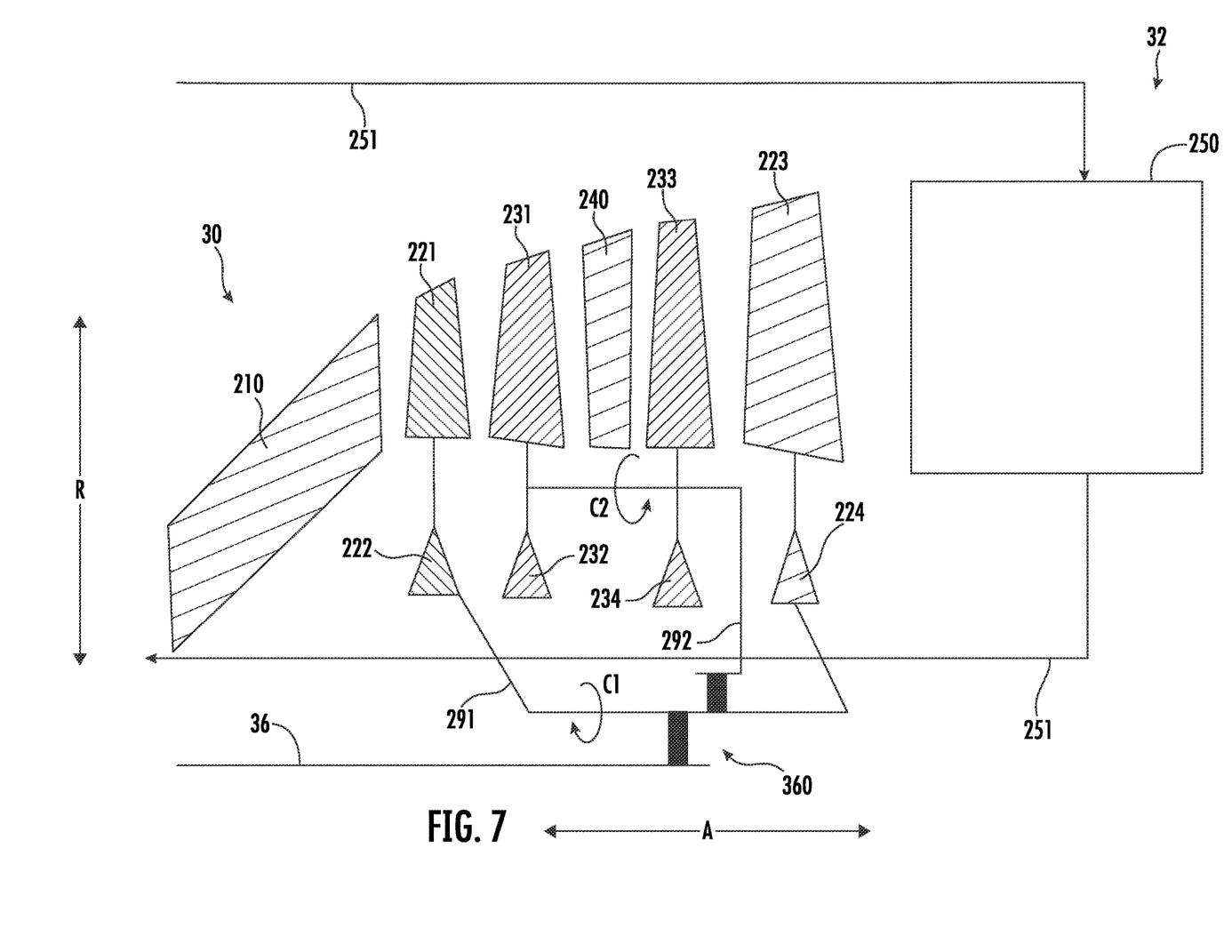
FIG. 7 is a schematic view of a portion of a turbine section and a portion of an exhaust section of a gas turbine engine according to one or more embodiments.

FIG. 7 is a schematic view of a portion of a turbine section and a portion of an exhaust section of a gas turbine engine according to one or more embodiments. More specifically, FIG. 7 shows a LP turbine 30 and a forward portion of an exhaust section 32 according to one or more embodiments. In certain exemplary embodiments, the turbine section of FIG. 7 may be configured in a similar manner as the exemplary turbine section described above with reference to FIG. 1, and similar reference numbers may be used for similar elements as those in FIG. 1. For example, the turbine section is generally configured as part of a gas turbine engine defining a radial direction R and an axial direction A.

The LP turbine 30 shown in FIG. 7 is similar to that in the above figures and, as such, descriptions of the structural elements that are similar thereto are omitted. As shown in FIG. 7, according to one or more embodiments, the LP turbine 30 further includes final stage LP turbine rotor blades 223 that are coupled to the first stage LP turbine rotor blades 221 via the first LP turbine spool 291 and are disposed downstream of the third stage LP turbine rotor blades 233. According to one or more embodiments, final stage LP turbine rotor blades 223 are disposed directly downstream of the third stage LP turbine rotor blades 233. The According to one or more embodiments, a final LP turbine rotor disk 224 is disposed on an inner side of the final stage LP turbine rotor blades 223 in the radial direction R. According to one or more embodiments, the final LP turbine rotor disk 224 is smaller in the radial direction R than each of the second LP turbine rotor disk 232 and the third LP turbine rotor disk 234, as the lower speed of the final stage LP turbine rotor blades 223 allows for smaller disk. According to one or more embodiments, the final LP turbine rotor disk 224 is coupled to the first LP turbine spool 291 so as to rotate together at the first speed in the first direction C1.

According to one or more embodiments, a gearbox 360 is coupled to the LP shaft or spool 36, such that the first stage LP turbine rotor blades 221, the final stage LP turbine rotor blades 223, the second stage LP turbine rotor blades 231, and the third stage LP turbine rotor blades 233 drive the LP shaft or spool 36 through the gearbox 360. Thus, the LP turbine 30 supports operation of the LP compressor 22, the rotation of the fan 38, or a combination thereof (see FIG. 1). According to one or more embodiments, the gearbox 360 is disposed partially or entirely on an inner side of the LP turbine 30 in the radial direction R. According to one or more embodiments, the LP shaft or spool 36 rotates at a speed that is lower than the second speed.

According to one or more embodiments, the gearbox 360 may be structured as a planetary gear system in which that the LP shaft or spool 36 is fixed to or connected to a sun gear, the first LP turbine spool is connected to planet gears that are disposed around the sun gear and are meshed with the sun gear, and the second LP turbine spool 292 is fixed to or connected to a ring gear disposed around the planet gears and is meshed with the planet gears. Thus, the first LP turbine spool 291 rotates at the first speed in the first direction C1 around the longitudinal centerline 12, and the second LP turbine spool 292 rotates at the second speed in the second direction C2 that is higher than the first LP turbine spool 291.

Furthermore, the reduction in stresses experienced by the final stage LP turbine rotor blades 223 may also enable materials that could not withstand the larger stresses experienced by the final stage LP turbine rotor blades of conventional high-speed low-pressure turbines. According to one or more embodiments, the final stage LP turbine rotor blades 223 are formed of nickel alloys or are formed of a material that comprises nickel alloys. According to one or more embodiments, the final stage LP turbine rotor blades 223 are formed of a different material from the second stage LP turbine rotor blades 231 and the third stage LP turbine rotor blades 233. According to one or more embodiments, the final stage LP turbine rotor blades 223 are formed of titanium aluminide or a material comprising titanium aluminide. As titanium aluminide is lighter than nickel alloys, forming the final stage LP turbine rotor blades 223 of titanium aluminide instead of nickel alloys, enabled by the lower speed of the first stage LP turbine rotor blades 221, results in significant weight savings which in turn enables a more efficient gas turbine engine 10. Alternatively, the final stage LP turbine rotor blades 223 may be formed of ceramic-matrix-composite materials or may be formed of materials including ceramic-matrix-composite materials.

According to one or more embodiments, the exhaust section 32 includes a heat exchanger 250 disposed downstream of the final stage LP turbine rotor blades 223. According to one or more embodiments, the heat exchanger 250 is disposed directly downstream of the final stage LP turbine rotor blades 223. A thermal heat transfer bus 251 that includes a thermal transfer fluid is thermally coupled to the heat exchanger 250, such that colder thermal transfer fluid enters the heat exchanger 250 and is heated by the combustion gases exhausted from the LP turbine 30, and the heated thermal transfer fluid leaves the heat exchanger 250 to another portion of the gas turbine engine 10. Thus, some of the waste heat entering the exhaust section 32 may be recovered for use in other portions of the engine.

According to one or more embodiments, the lower speed of rotation of the final stage LP turbine rotor blades 223 also reduces a Mach number of the combustion gases exiting the LP turbine 30 and entering the exhaust section 32. For example, combustion gases may exit conventional high-speed low-pressure turbines and enter the exhaust section at a Mach number equal to around ½ Ma. According to one or more embodiments, the LP turbine 30 is structured such that combustion gases exit the LP turbine 30 and enter the exhaust section 32 at a Mach number of ⅓ Ma or less. With a Mach number of ⅓ Ma or less, a frame-integrated heat exchanger that is integrated into the frame of the turbomachine 16 may be employed as the heat exchanger 250 in the exhaust section 32. According to one or more embodiments, the LP turbine 30 is structured such that combustion gases exit the LP turbine 30 and enter the exhaust section 32 at a Mach number of ¼ Ma or less. With Mach number of a ¼ Ma or less, a traditional heat exchanger separate from the frame of the turbomachine 16 may be employed as the heat exchanger 250 in the exhaust section 32. According to one or more embodiments, thermal heat transfer bus 251 may be coupled to a portion of the core air flowpath 37 upstream of the combustion section 26 or coupled to a fuel line for heating the fuel prior to injecting the fuel into the combustion section 26 (see FIG. 1).

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A turbine section for a gas turbine engine defining a radial direction, the turbine section comprising: a low-pressure (LP) turbine comprising: a first plurality of LP turbine blades, the first plurality of LP turbine blades comprising a first stage comprising first stage LP turbine blades that rotate in a first direction at a first speed; a second plurality of LP turbine blades, the second plurality of LP turbine blades comprising a plurality of stages of LP turbine blades, disposed downstream of the first stage LP turbine blades, that rotate in a second direction opposite the first direction at a second speed; a first LP turbine spool connected to the first plurality of LP turbine blades on an inner side of the first plurality of LP turbine blades in the radial direction; and a second LP turbine spool connected to the second plurality of LP turbine blades on an inner side of the second plurality of LP turbine blades in the radial direction, wherein the first speed is lower than the second speed.

The turbine section of any preceding clause, wherein the plurality of stages of LP turbine blades of the second plurality of LP turbine blades comprises a second stage having second stage LP turbine blades and a third stage having third stage LP turbine blades, and wherein the LP turbine further comprises: guide vanes disposed between the second stage LP turbine blades and the third stage LP turbine blades.

The turbine section of any preceding clause, wherein the plurality of stages of LP turbine blades of the second plurality of LP turbine blades comprises a second stage having second stage LP turbine blades, and wherein the second stage LP turbine blades are disposed directly downstream of the first stage LP turbine blades.

The turbine section of one or more of these clauses, wherein the first stage LP turbine blades are formed of a different material from the plurality of stages of LP turbine blades.

The turbine section of any preceding clause, further comprising: a gearbox, wherein the second LP turbine spool is coupled to the gearbox.

The turbine section of one or more of these clauses, wherein the first plurality of LP turbine blades comprises a final stage comprising final stage LP turbine blades disposed downstream of the second plurality of LP turbine blades, wherein the final stage LP turbine blades rotate in the first direction at the first speed.

The turbine section of any preceding clause, further comprising: a high-pressure turbine located upstream of the low-pressure turbine.

The turbine section of any preceding clause, wherein the LP turbine further comprises a drum positioned inward of an airflow path through the LP turbine along the radial direction, wherein the plurality of stages of LP turbine blades of the second plurality of LP turbine rotor blades are coupled together with the drum, wherein each of the first plurality of LP turbine blades and each of the second plurality of LP turbine blades includes an outer end along the radial direction, and wherein each of the first plurality of LP turbine blades and each of the second plurality of LP turbine blades is mechanically isolated at the outer end.

A gas turbine engine comprises a compressor section; a combustion section; and a turbine section arranged in serial flow order, wherein the turbine section comprises a low-pressure (LP) turbine, the LP turbine comprising: a first plurality of LP turbine blades, the first plurality of LP turbine blades comprising a first stage comprising first stage LP turbine blades that rotate in a first direction at a first speed; a second plurality of LP turbine blades, the second plurality of LP turbine blades comprising a plurality of stages of LP turbine blades, disposed downstream of the first stage LP turbine blades, that rotate in a second direction opposite the first direction at a second speed; a first LP turbine spool connected to the first plurality of LP turbine blades on an inner side of the first plurality of LP turbine blades in the radial direction; and a second LP turbine spool connected to the second plurality of LP turbine blades on an inner side of the second plurality of LP turbine blades in the radial direction, and wherein the first speed is lower than the second speed.

The gas turbine engine of any preceding clause, wherein the plurality of stages of LP turbine blades of the second plurality of LP turbine blades comprises a second stage having second stage LP turbine blades and a third stage having third stage LP turbine blades, and wherein the LP turbine further comprises: guide vanes disposed between the second stage LP turbine blades and the third stage LP turbine blades.

The gas turbine engine of any preceding clause, wherein the plurality of stages of LP turbine blades of the second plurality of LP turbine blades comprises a second stage having second stage LP turbine blades, and wherein the second stage LP turbine blades are disposed directly downstream of the first stage LP turbine blades.

The gas turbine engine of one or more of these clauses, wherein the first stage LP turbine blades are formed of a different material from the plurality of stages of LP turbine blades.

The gas turbine engine of any preceding clause, further comprising: a fan; and a fan shaft for driving the fan, wherein the first spool is rotatable with the fan shaft at the same speed as the fan shaft.

The gas turbine engine of any preceding clause, further comprising: a heat exchanger, wherein the first plurality of LP turbine blades comprises a final stage comprising final stage LP turbine blades disposed downstream of the second plurality of LP turbine blades, wherein the final stage LP turbine blades rotate in the first direction at the first speed, and wherein the heat exchanger is disposed downstream of the final stage LP turbine blades.

The gas turbine engine of any preceding clause, further comprising: a fan, a fan shaft for driving the fan that rotates at a speed that is lower than the second speed, and a gearbox, wherein the fan shaft, the first LP turbine spool, and the second LP turbine spool are coupled to the gearbox.

The gas turbine engine of any preceding clause, further comprising: an electric generator, and a gearbox, wherein the second LP turbine spool and the electric generator are coupled to the gearbox.

The gas turbine engine of any preceding clause, further comprising: a fan, a fan shaft for driving the fan, and an electric generator, wherein the second LP turbine spool and the fan shaft are coupled to the electric generator.

The gas turbine engine of any preceding clause, further comprising: a fan, a fan shaft for driving the fan, and an electric generator, wherein the first LP turbine spool, the second LP turbine spool, and the fan shaft are coupled to the electric generator.

The gas turbine engine of any preceding clause, wherein the turbine section further comprises a high-pressure turbine located upstream of the low-pressure turbine.

The gas turbine engine of any preceding clause, wherein the LP turbine further comprises a drum positioned inward of an airflow path through the LP turbine along the radial direction, wherein the plurality of stages of LP turbine blades of the second plurality of LP turbine rotor blades are coupled together with the drum, wherein each of the first plurality of LP turbine blades and each of the second plurality of LP turbine blades includes an outer end along the radial direction, and wherein each of the first plurality of LP turbine blades and each of the second plurality of LP turbine blades is mechanically isolated at the outer end.

The gas turbine engine of any preceding clause, wherein the gearbox is a planetary gearbox in which that the fan shaft is fixed to or connected to a sun gear, the first LP turbine spool is connected to planet gears that are disposed around the sun gear and are meshed with the sun gear, and the second LP turbine spool is fixed to or connected to a ring gear disposed around the planet gears and is meshed with the planet gears.

The gas turbine engine of any preceding clause, wherein the heat exchanger is thermally coupled to a thermal heat transfer bus that includes a thermal transfer fluid and that is configured to remove heat from the heat exchanger.

The gas turbine engine of any preceding clause, further comprising a contra-rotating electric generator to which the second LP turbine spool and the fan shaft are coupled.

The gas turbine engine of any preceding clause, wherein the contra-rotating electric generator is further coupled to the first LP turbine spool.

We claim:
1. A turbine section for a gas turbine engine defining a radial direction, the turbine section comprising:
    a low-pressure (LP) turbine comprising:
    an outer casing;
    an inner drum positioned inward of the outer casing in the radial direction, the outer casing and the inner drum defining an airflow path through the LP turbine;
    a first plurality of LP turbine blades, the first plurality of LP turbine blades comprising a first stage comprising first stage LP turbine blades that rotate in a first direction at a first speed, wherein the first plurality of LP turbine blades extend in the radial direction from an inner end coupled to the inner drum to an outer end isolated from the outer casing;
    a second plurality of LP turbine blades, the second plurality of LP turbine blades comprising a second stage comprising second stage LP turbine blades and a third stage comprising third stage LP turbine blades, disposed downstream of the first stage LP turbine blades, that rotate in a second direction opposite the first direction at a second speed, wherein the second plurality of LP turbine blades extend in the radial direction from an inner end coupled to the inner drum to an outer end isolated from the outer casing;
    first stationary guide vanes disposed upstream of the first stage LP turbine blades;
    second stationary guide vanes disposed between the second stage LP turbine blades and the third stage LP turbine blades;
    a first LP turbine spool connected to the first plurality of LP turbine blades on an inner side of the first plurality of LP turbine blades in the radial direction; and a second LP turbine spool connected to the second plurality of LP turbine blades on an inner side of the second plurality of LP turbine blades in the radial direction,
wherein the first speed is lower than the second speed.

2. The turbine section of claim 1, wherein the second stage LP turbine blades are disposed directly downstream of the first stage LP turbine.

3. The turbine section of claim 1, wherein the first stage LP turbine blades are formed of a different material from the second plurality of LP turbine blades.

4. The turbine section of claim 1, further comprising:
a gearbox,
wherein the second LP turbine spool is coupled to the gearbox.

5. The turbine section of claim 1,
wherein the first plurality of LP turbine blades comprises a final stage comprising final stage LP turbine blades disposed downstream of the second plurality of LP turbine blades, and
wherein the final stage LP turbine rotate in the first direction at the first speed.

6. The turbine section of claim 1, further comprising:
a high-pressure turbine located upstream of the LP turbine.

7. A gas turbine engine, comprising:
a compressor section;
a combustion section; and
a turbine section arranged in serial flow order,
wherein the turbine section comprises a low-pressure (LP) turbine, the LP turbine comprising:
an outer casing;
an inner drum positioned inward of the outer casing in a radial direction, the outer casing and the inner drum defining an airflow path through the LP turbine;
a first plurality of LP turbine blades, the first plurality of LP turbine blades comprising a first stage comprising first stage LP turbine blades that rotate in a first direction at a first speed, wherein the first plurality of LP turbine blades extend in the radial direction from an inner end coupled to the inner drum to an outer end isolated from the outer casing;
a second plurality of LP turbine blades, the second plurality of LP turbine blades comprising a second stage comprising second stage LP turbine blades and a third stage comprising third stage LP turbine blades disposed downstream of the first stage LP turbine blades that rotate in a second direction opposite the first direction at a second speed, wherein the second plurality of LP turbine blades extend in the radial direction from an inner end coupled to the inner drum to an outer end isolated from the outer casing;
first stationary guide vanes disposed upstream of the first stage LP turbine blades;
second stationary guide vanes disposed between the second stage LP turbine blades and the third stage LP turbine blades;
a first LP turbine spool connected to the first plurality of LP turbine blades on an inner side of the first plurality of LP turbine blades in a radial direction; and
a second LP turbine spool connected to the second plurality of LP turbine blades on an inner side of the second plurality of LP turbine blades in the radial direction, and
wherein the first speed is lower than the second speed.

8. The gas turbine engine of claim 7,
wherein the second stage LP turbine blades are disposed directly downstream of the first stage LP turbine.

9. The gas turbine engine of claim 7, wherein the first stage LP turbine blades are formed of a different material from the second plurality of LP turbine blades.

10. The gas turbine engine of claim 7, further comprising:
a fan; and
a fan shaft for driving the fan,
wherein the first LP turbine spool is rotatable with the fan shaft at the same speed as the fan shaft.

11. The gas turbine engine of claim 7, further comprising:
a heat exchanger,
wherein the first plurality of LP turbine blades comprises a final stage comprising final stage LP turbine blades disposed downstream of the second plurality of LP turbine blades,
wherein the final stage LP turbine rotate in the first direction at the first speed, and
wherein the heat exchanger is disposed downstream of the final stage LP turbine blades.

12. The gas turbine engine of claim 7, further comprising:
a fan,
a fan shaft for driving the fan that rotates at a speed that is lower than the second speed, and
a gearbox,
wherein the fan shaft, the first LP turbine spool, and the second LP turbine spool are coupled to the gearbox.

13. The gas turbine engine of claim 7, further comprising:
an electric generator, and
a gearbox,
wherein the second LP turbine spool and the electric generator are coupled to the gearbox.

14. The gas turbine engine of claim 7, further comprising:
a fan,
a fan shaft for driving the fan, and
an electric generator,
wherein the second LP turbine spool and the fan shaft are coupled to the electric generator.

15. The gas turbine engine of claim 7, further comprising:
a fan,
a fan shaft for driving the fan, and
an electric generator,
wherein the first LP turbine spool, the second LP turbine spool, and the fan shaft are coupled to the electric generator.

16. The gas turbine engine of claim 7, wherein the turbine section further comprises a high-pressure turbine located upstream of the LP turbine.

* * * * *